(12) United States Patent
Schromm

(10) Patent No.: US 7,624,536 B2
(45) Date of Patent: Dec. 1, 2009

(54) CONTAINER WITH PLANT IDENTIFICATION TAG SLOT

(75) Inventor: Fred Schromm, Uniontown, OH (US)

(73) Assignee: Landmark Plastic Corporation, Akron, OH (US)

( * ) Notice: Subject to any disclaimer, the term of this patent is extended or adjusted under 35 U.S.C. 154(b) by 0 days.

(21) Appl. No.: 11/741,482

(22) Filed: Apr. 27, 2007

(65) Prior Publication Data
US 2007/0256358 A1 Nov. 8, 2007

Related U.S. Application Data

(60) Provisional application No. 60/745,804, filed on Apr. 27, 2006.

(51) Int. Cl.
*A01G 9/02* (2006.01)
*G09F 23/00* (2006.01)
(52) U.S. Cl. ............................ 47/66.6; 47/65.5; 40/645
(58) Field of Classification Search .................. 47/65.5, 47/66.6; 40/645
See application file for complete search history.

(56) References Cited

U.S. PATENT DOCUMENTS

| | | | |
|---|---|---|---|
| 3,762,625 A * | 10/1973 | Mojonnier | ............... 229/123.1 |
| 3,876,130 A | 4/1975 | Haase | |
| 3,996,832 A | 12/1976 | Schubert et al. | |
| 4,079,880 A | 3/1978 | Edwards | |
| 4,096,986 A | 6/1978 | Florian | |
| 4,216,622 A * | 8/1980 | Hollenbach et al. | ............ 47/71 |
| 5,941,019 A | 8/1999 | Guarriello, Sr. et al. | |
| 6,134,832 A * | 10/2000 | Bokmiller et al. | ............ 47/66.1 |
| 6,199,319 B1 * | 3/2001 | Skinner | ...................... 47/66.6 |
| 6,463,696 B2 | 10/2002 | Skinner | |
| D483,690 S * | 12/2003 | Sieverding | ................. D11/152 |
| 2002/0190067 A1 | 12/2002 | Getsy | |
| 2003/0202081 A1 * | 10/2003 | Marten et al. | ............... 347/101 |
| 2004/0211118 A1 * | 10/2004 | Smith et al. | .................. 47/66.5 |
| 2005/0223640 A1 | 10/2005 | Hall et al. | |
| 2006/0272208 A1 * | 12/2006 | Altman et al. | ............... 47/66.1 |

* cited by examiner

*Primary Examiner*—Michael R Mansen
*Assistant Examiner*—Monica L Williams
(74) *Attorney, Agent, or Firm*—Bret A. Hrivnak; Hahn Loeser + Parks LLP

(57) ABSTRACT

A plant container having a frustoconical sidewall extending outwardly and vertically from a bottom of the container to a top of the container, a lip positioned near the top of the container, and a tag-accepting slot formed in the lip. The container may also include a first nesting step located below the lip and extending circumferentially around the container, the nesting step extending outwardly to a maximum circumference and including a container-stacking stop surface extending between the sidewall and the maximum circumference and a extending vertically from the maximum circumference. Further, the slot may substantially be positioned above a slot area, the slot area being an area where the maximum circumference of the nesting step is reduced.

22 Claims, 5 Drawing Sheets

CONTAINER WITH PLANT IDENTIFICATION TAG SLOT

This application claims priority to provisional application Ser. No. 60/745,804, filed Apr. 27, 2006, the disclosure of which is hereby incorporated by reference.

BACKGROUND

Growers that raise plants for retail sale commonly use containers or pots. By growing plants in containers, growers benefit in ease of transporting and managing the plants. Further, plants grown in containers or pots are less susceptible to root damage than field grown plants that are potted for sale.

One problem with plant containers is the difficulty in knowing what type of plant is in the pot. The beneficial ease of transporting the container exacerbates the identification problem when containers from one location are mixed with containers from other locations.

Growers and container manufacturers have devised a variety of plant identification tags and methods for applying the tags to their respective containers. Some tags are inserted into the soil adjacent to the plant, some tags attach to a container lip or a side of the container via a slit. Slits are difficult to use and penetrate with a tag, as the slit must be opened, which may be difficult due to the rigidity of the materials used to form containers. Ultimately, many of the users of containers having slits end up placing the tags in the soil. Accordingly, many of these techniques result in tags that are easily lost, or tags that are located in positions that are inconvenient to read, or containers that are less efficient to manufacture. Tags that are easily removable can decrease retailer revenue when plants are not properly identifiable when tags fall out or when consumers switch tags.

As many plant containers are made for temporary, one-time use, the cost of the container is important. Vacuum thermal formed containers in the prior art have been attractively priced compared to injection-molded containers. However, up until now, vacuum thermal formed containers had design difficulties that impeded production on high speed forming and printing equipment.

Many plant containers are manufactured in a location remote from the grower. Consequently, many plant containers are designed to nest together to maximize the efficiency of shipping and handling the containers. Some nested container designs can be difficult to separate once nested. This occurs when a large amount of the inside surface of one container contacts the outside surface of the nested container. These containers can nest so tightly that suction and friction make separating the containers difficult. When injection molding the containers, it is possible to add embossments to prevent the containers from nesting tightly.

Another concern in the manufacturing of containers is the printing of graphics and labels on the surface of the container. Some retailers desire printing to be on the outer surface of the container covering approximately 360 degrees around the container. Typically, when graphics are applied to the container, a single container is presented to a printing apparatus, where the container may be rotated while the printing apparatus applies a decoration. Some printing processes involve rotating the container in a desired orientation. One method used to orient the container during printing is to mold the container with features that the printing apparatus can contact as the part rotates in order to trace or follow or hold on to the shape of the feature. Alternately, a feature on the container may provide a smooth guide for orienting the container during rotation. In order for the container to be rotated efficiently and effectively, the container should not have features that stop or lock or interrupt a smooth rotation in a conventional high speed printing station.

Some thermal formed containers have features that prevent the containers from nesting too tightly. However, these prior thermal formed features impede the rotation of the container on conventional printing equipment.

Injection molding has been employed to manufacture plant containers. However, the injection molding process requires substantially uniform wall thicknesses that are thick enough for the molten thermoplastic to fill. This causes more material to be used than is structurally necessary. Further, the injection molding process is costly when making large volumes of parts. Injection molds with large numbers of cavities are expensive to manufacture, and must be run in large, expensive molding machines.

There remains a need in the art for a thermal formed plant container that overcomes one or more of these problems.

SUMMARY OF THE INVENTION

A particular embodiment of the present invention includes a plant container comprising: a frustoconical sidewall extending outwardly and vertically from a bottom of the container to a top of the container; a lip positioned near the top of the container; and, a tag-accepting slot formed in the lip, the container being formed of a thermoplastic in a vacuum thermal forming process.

An additional embodiment A second embodiment of the present invention overcomes at least one disadvantage of the prior art by providing a process for manufacturing a plant container comprising the steps of providing a heated thermal forming mold comprising a vacuum, the mold having a forming shape comprising a frustoconical sidewall having a draft angle and a first circumference at an upper edge of the sidewall, a bottom, a lip positioned near the top of the forming shape, a nesting step between the lip and the sidewall, the nesting step extending around less than all of the first circumference of the sidewall, and wherein the side of the nesting step has a draft angle in the opposite direction of the sidewall draft angle; providing a sheet of thermoplastic material; heating the sheet of material to a temperature higher than the material's glass transition temperature; placing the heated sheet over the mold cavity; using the vacuum to draw the sheet against the mold surface; cooling the sheet of material; ejecting the formed container from the mold; providing a first die set comprising at least one punch and a corresponding die; using the first die set to punch a slot through the lip, the slot positioned where the nesting step is absent; providing a second die set comprising a shearing die; and using the second die set to trim the lip from the sheet.

A third embodiment of the present invention overcomes at least one disadvantage of the prior art by providing a plant container comprising a frustoconical sidewall having a draft angle and a first circumference at an upper edge of the sidewall; a bottom comprising one or more apertures; a lip positioned near the top of the container; a first nesting step between the lip and the sidewall, the nesting step extending around less than all of the first circumference of the sidewall; a second nesting step between the lip and the sidewall; a slot through the lip, the slot positioned where the first nesting step is absent; wherein the side of the second nesting step has a draft angle approximately the same as the sidewall draft angle, and wherein the side of the first nesting step has a draft angle in the opposite direction of the sidewall draft angle.

DETAILED DESCRIPTION

Figure 1:
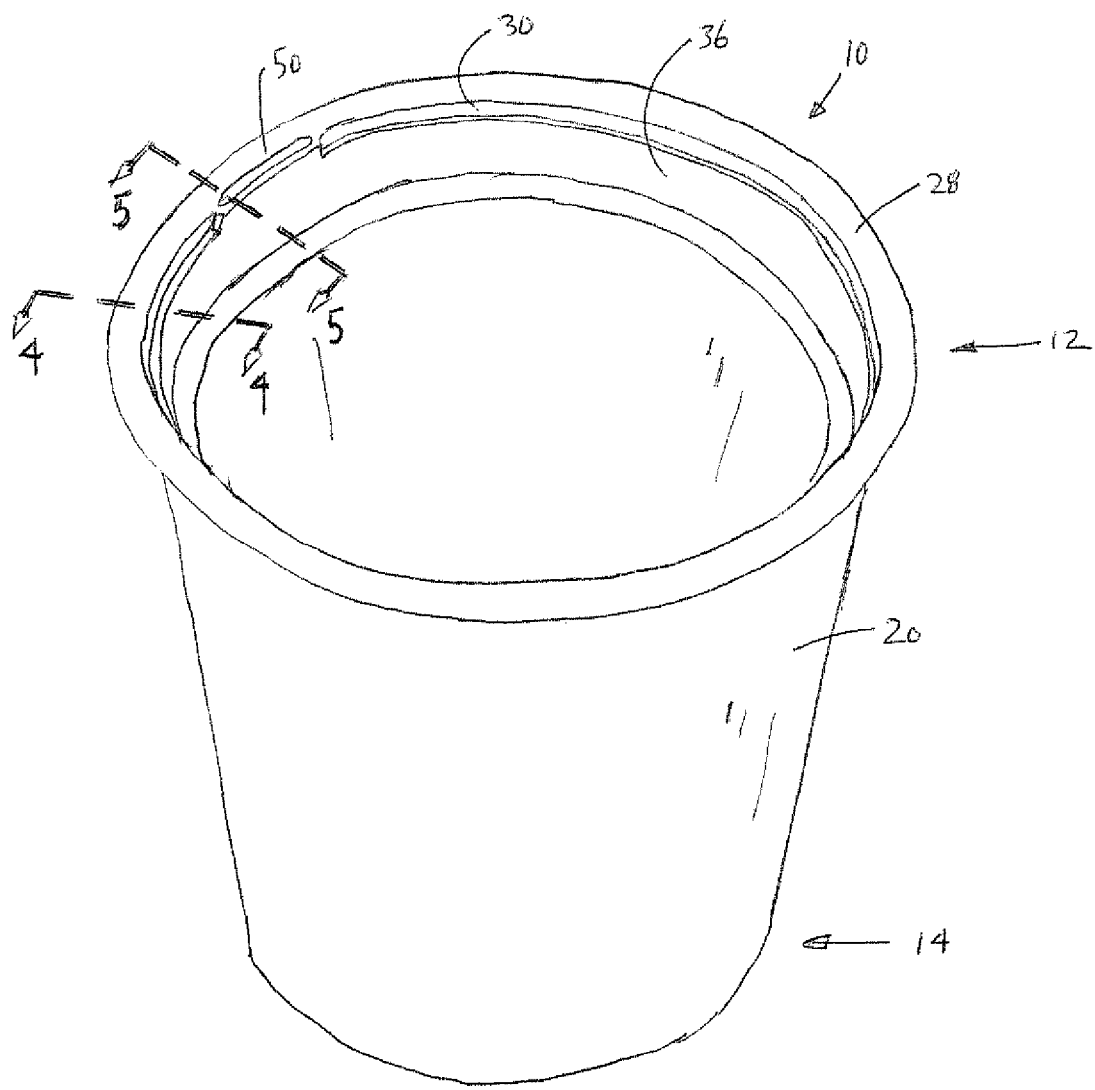
FIG. 1 is a top perspective view of a plant container of the present invention.
Figure 2:
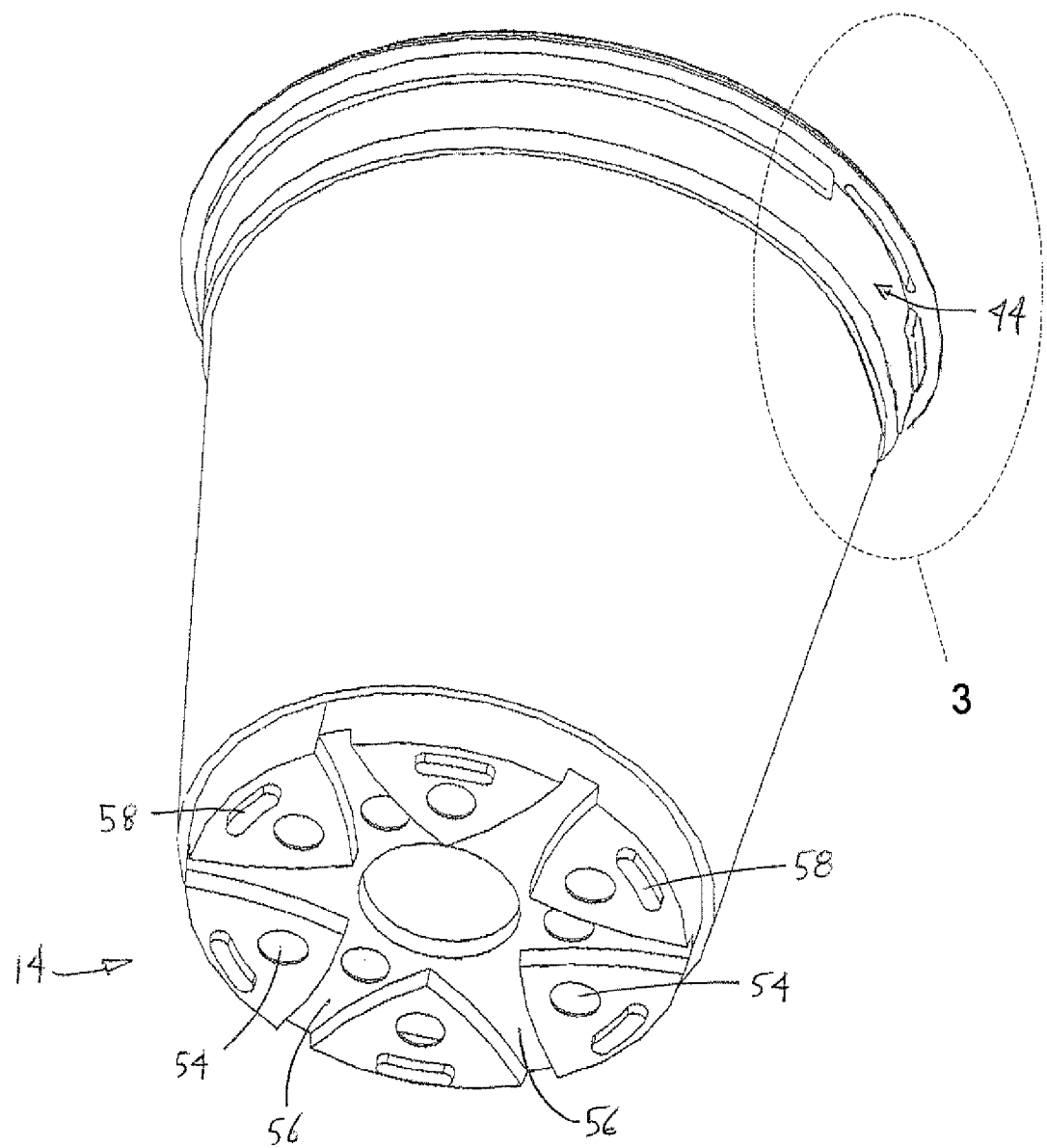
FIG. 2 is a bottom perspective view of a plant container of the present invention.
Figure 3:
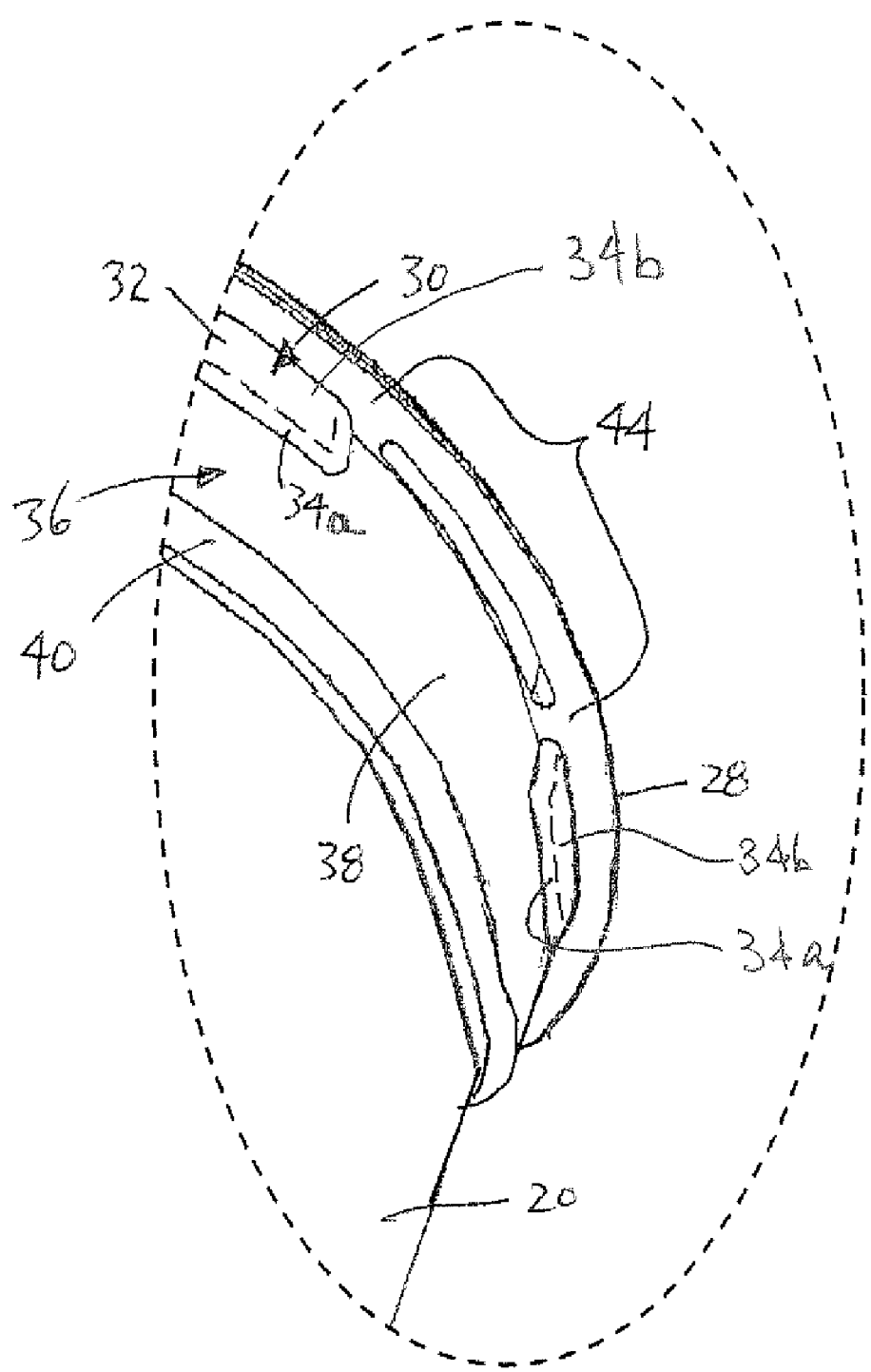
FIG. 3 is a partial view showing a slot indicated by detail 3 of FIG. 2.

Referring now to FIGS. 1-3, one embodiment of a plant container of the present invention is shown. The plant container 10 has a substantially frustoconical shape having a top 12 and a bottom 14. The container top 12 is open, and the container bottom 14 is substantially closed, such that the container 10 is suitable for growing plants. In this description and in the appended claims, the term frustoconical describes a frustum, or the portion of a substantially conical shape between two parallel planes extending through or cutting through the shape. The frustoconical shape tapers according to a draft angle.

The container 10 comprises a sidewall 20, the bottom 14, and a lip 28. Between the sidewall 20 and the lip 28 is at least one nesting step. In the embodiment of FIGS. 1-3, two nesting steps are shown, but only one may be necessary. Adjacent to the lip 28 is a first nesting step 30 having a frustoconical first step wall 32 and a horizontally extending first step ledge 34a, which is a container-stacking stop surface that may extend in any horizontal direction (i.e., it may extend horizontally at an angle). The nesting step 30 also includes a surface 34b that extends vertically from the stop surface 34a, which may extend any angle in a vertical direction, including without limitation extending inwardly at a reverse draft, as detailed below. Adjacent to the ledge 34a is a second nesting step 36 having a frustoconical second step wall 38 and an approximately horizontal second step ledge 40.

As indicated by FIG. 3, the first nesting step may not be continuous in shape around the perimeter of the container. The container comprises a slot area 44 made by locally forming a portion of the perimeter of the container without the first nesting step 30. Alternately, the first nesting step 30 is present around the container perimeter but is reduced in depth in the slot area 44. A slot 50 is located through the lip 28 adjacent to the slot area 44, where the slot allows an identification tag to pass through to extend into the slot area 44. More than one slot 50 may exist within the slot area 44, and the container may have more than one slot area 44.

The slot 50 is sized for an identification tag to pass through, and is formed by removing a desired amount of material from the container, which is different from a slit, which is discontinuity in the material generally formed by a cut or slice in the material. In the embodiment of FIGS. 1-3, the slot 50 is approximately 1.5 millimeters wide and approximately 25 millimeters long; however, it is contemplated that slot 50 may be of any desired size and shape. The slot may have an arcuate shape that may follow the contour of the lip 28. The slot 50 accommodates a multitude of identification tag shapes currently used by growers and retailers.

Figure 6:
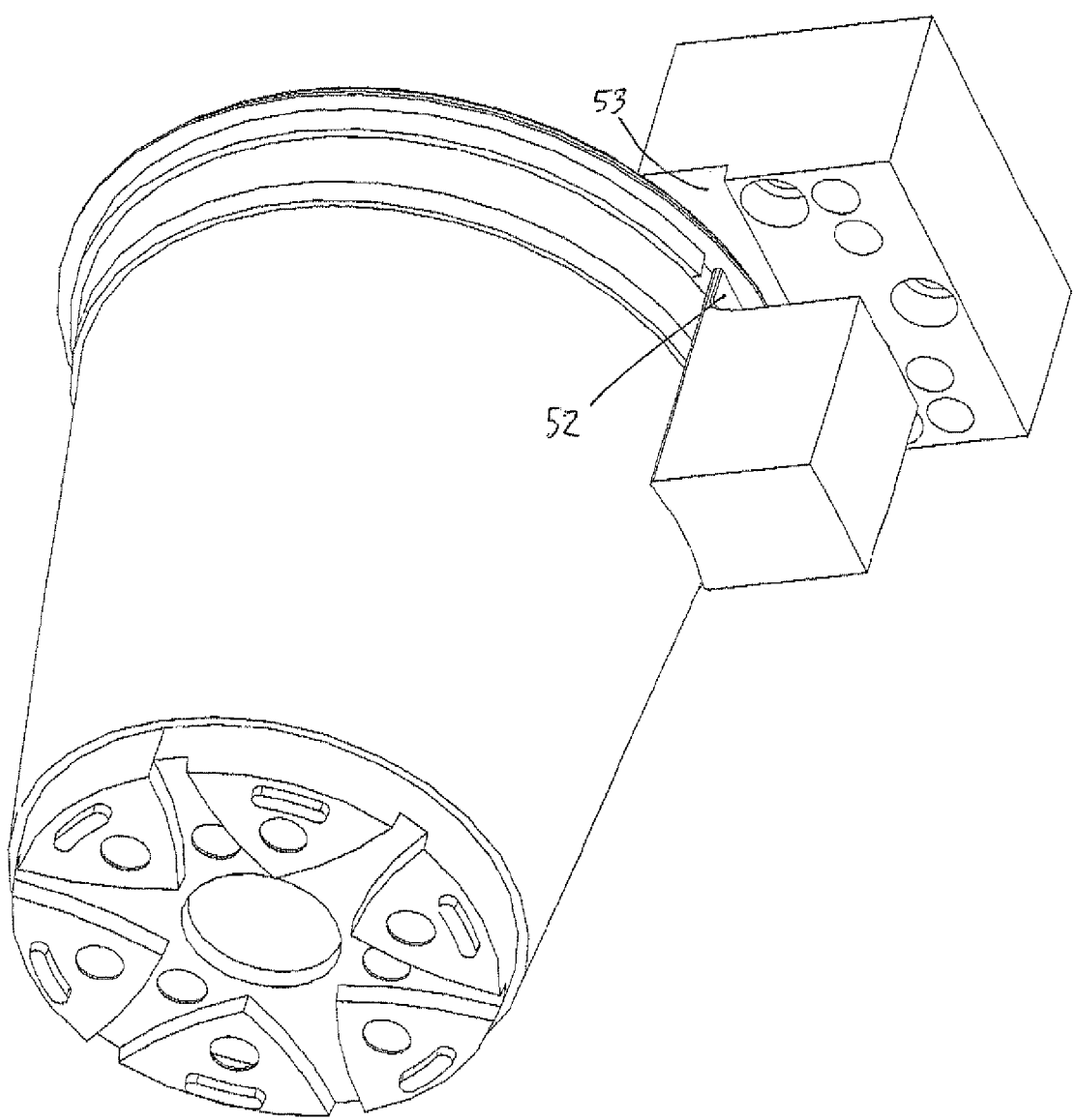
FIG. 6 is a bottom perspective view of a plant container of the present invention adjacent to a punch and die.

The slot area 44 is sized to accommodate the slot 50, and more specifically, a tag positioned within the slot 50. In the embodiment of FIGS. 1-3, the width of the slot area 44 is within a range of approximately 25 to 38 millimeters. However, it is contemplated that slot area 44 may be of a larger size, so long as it does not interfere with the desired printing process and proper nesting, if printing and/or nesting is desired of the container, for which the slot area should extend less than half the circumference of the first nesting step 30. The slot area 44 may be sized to accommodate the width of a slot punch 52 that may be used in a punching operation to produce the slot 50. As illustrated in FIG. 6, the slot punch 52 passes the slot area 44 to reach the lip 28 during the punching operation. The slot punch 52 may engage a corresponding die 53 positioned on the opposite side of the lip 28. By reducing the depth of, or removing a portion of the first nesting step 30, the punch 52 may access lip 28 to form slot 50. Otherwise, lip 28 would have to become bigger (i.e., extend further from container 10) so that punch 52 would be able to clear the first nesting step 30 and form slot 50. This would either require that lip 28 extend to a larger circumference, which would widen the entire container 10, or that container 10 shrink inwardly so that lip 28 can extend further without widening the entire container 10. If lip 28 grows without the container shrinking, the overall width of the container 10 increases and can cause the container 10 to become incompatible with standard transport/shipping trays. If the container 10 shrinks inwardly, the volume (i.e., capacity) of the container decreases, which reduces the marketability, competitiveness, and value of the container to the consumers.

The slot area 44 is also sized so as to not interfere with the printing operation. The slot area 44 should be sized so that the first nesting step 30 is an effective guide for orienting the container during rotation in the printing equipment. The slot area 44 is sized so that the container 10 does not wobble in the printing operation. Further, the slot area 44 should be sufficiently sized so not to interfere with the denesting (un-nesting) of the containers 10, which become difficult to remove from a nested orientation when the slot area 44 is too big and thereby increases the contact area between the nesting containers 10, such as when the containers 10 become cocked or titled with respect to each other.

One method used to orient the container during printing is to mold the container with features that the printing apparatus can contact as the part rotates in order to trace or follow or hold on to the shape of the feature. Alternately, a feature on the container may provide a smooth guide for orienting the container during rotation. In order for the container to be rotated efficiently and effectively, the container should not have features that stop or lock or interrupt a smooth rotation in a conventional high speed printing station.

Figures 4, 5:
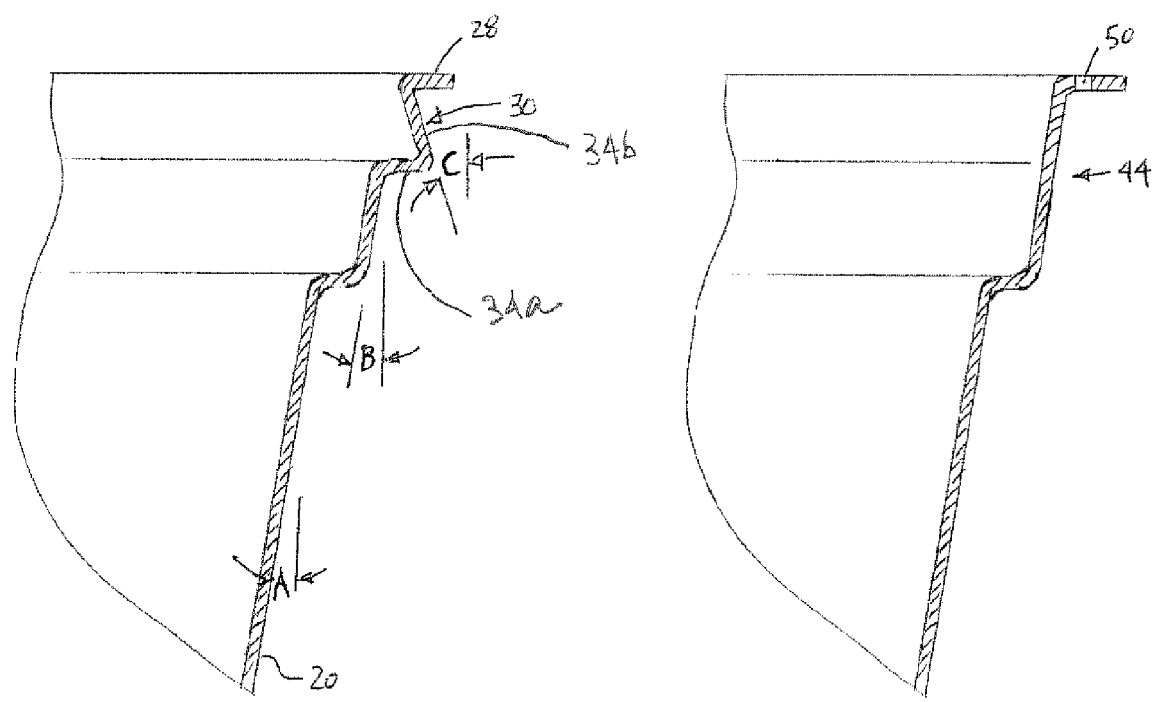
FIG. 4 is a cross sectional view through section 4-4 in FIG. 1.
FIG. 5 is a cross sectional view through section 5-5 in FIG. 1.

As indicated in FIG. 4, the sidewall 20 has a draft angle A being an angle in a range of approximately 2 to 10 degrees; however, it is contemplated that any angle may be used. In one embodiment, the draft angle A is 5 degrees. The draft angle A facilitates thermal forming and nesting of the containers 10.

In the embodiment of FIG. 4, the second step wall 38 has a draft angle B, which may be approximately the same as the draft angle A. It is contemplated that the draft angle B may be the same as or different than draft angle A.

The first step wall 32 has a draft angle C, indicated in FIG. 4. It is contemplated that the draft angle C may be the same as or different than the draft angles A and B. In the embodiment of FIG. 4, the draft angle C is a reverse draft. When the draft angle C has a reverse draft angle, the size of ledge 34a increases so that ledge 34a functions as a stop and rest for the lip 28 or other feature of a second container nested (stacked) inside the container to stop and rest against when two containers are nested together.

The container bottom 14 is substantially closed and comprises one or more drain holes 54. The drain holes 54 may provide an outlet for excess water to pass through when being used as a plant container.

As shown in FIG. 2, the bottom 14 may comprise additional structures such as ribs 56 that add rigidity to the bottom. In this embodiment, feet 58 are formed as protrusions on the bottom 14 of the container.

The container 10 may be made of a thermoplastic material such as polystyrene or polypropylene, or other moldable thermoplastic resins. The container may be made from a material that is efficient to mold and can easily be printed on.

The container 10 may be made using any vacuum thermal forming process known in the art. Thermal forming molds can be either cavities or plugs, and are fabricated to match the shape of the desired part. A sheet of thermoplastic material is heated until the sheet is pliable, which is at a temperature hotter than the material's glass transition temperature, but cooler than the material's melt transition temperature. In this temperature range, the thermoplastic sheet can be formed against the mold.

The thermal forming mold comprises a plurality of small holes, through which a vacuum is drawn. As the hot sheet of thermoplastic nears the mold surface, the suction from the vacuum draws the sheet to the mold surface. The thermoplastic cools in contact with the mold until the material is cool enough to retain its shape. It is contemplated that any other variations of thermal forming may be used.

The slot 50 and drain holes 54 may be punched by a traditional die set comprising the slot punch 52, one or more drain hole punches, and corresponding dies that engages the punches. In the present invention, the slot 50 and the drain holes 54 may be punched at substantially the same time before the formed container is trimmed from the sheet, but any sequence of operation in punching and trimming may be used.

Trimming the formed container from the thermoplastic sheet may be accomplished by a trim die, shear, steel rule die, saw, knife, laser trimmer, water jet trimmer, or any other common trimming tool known in the art.

It is contemplated that a compound die could be employed to punch the slot 50 and drain holes 54 and trim the part in the same die stroke.

Consequently, the container 10 of the present invention may be manufactured by a vacuum thermal forming process comprising the steps of providing a heated thermal forming mold comprising a vacuum; providing a sheet of thermoplastic material; heating the sheet of material to a temperature higher than the material's glass transition temperature; placing the heated sheet over the mold cavity; using the vacuum to draw the sheet onto the mold surface; cooling the sheet of material; ejecting the formed container from the mold; providing a first die set comprising at least one punch and a corresponding die; using the first die set to punch the bottom holes 54 and slot 50 in one stroke; providing a second die set comprising a shearing die; and using the second die set to trim the lip 28 from the sheet.

In the thermal formed embodiment, the slot 50 is made when the slot punch 52 of the first die set pushes through the lip 28, which may be resting against the die 53. As can be observed in FIGS. 4-6, the first nesting step 30 may be locally removed in slot area 44 to provide clearance for the punch die that makes slot 50. By removing the first nesting step 30 in the slot area 44, the first nesting step 30 may not be continuous around the container.

Substantially reducing the depth of, or removing a portion of the first nesting step 30 only in the slot area 44 is advantageous because the removal in the small slot area 44 does not significantly diminish the effectiveness of the first nesting step 30. The first nesting step 30 of the present invention prevents nested containers 10 from pressing together tightly, and provides a sufficient surface for orienting and guiding the rotation of the container in the printing process. The formation of the slot area 44 allows for the creation of the slot 50 within the lip 28, while not impeding or otherwise hindering the rotation of the container in the printing equipment. Further, by reducing or eliminating nesting step 30 within slot area 44, a tag may be inserted into slot 50 without interfering with the first nesting step 30, and thereby allowing the tag to extend vertically from container 10. Finally, reducing or eliminating nesting step 30 within slot area 44 allows a punch 52 to form slot 50 without having to widen or shrink container 10, which can reduce product performance and desirability. Tag slots 50, which are formed by removing material from the container, provide at least one an advantage over slits, which are formed by cutting or slicing the container without removal of any material. Tags are difficult to place into slits, as the material surrounding the slits may be stiff and difficult to manipulate. To the contrary, tag slots provide for simpler acceptance of tags since there is no material to displace prior to or concurrent with entry of a tag.

Additional advantages and modifications will readily occur to those skilled in the art. Accordingly, the invention in its broader aspects is not limited to the specific details and illustrative examples shown and described here.

What is claimed is:

1. A plant container comprising:
    a frustoconical sidewall extending outwardly and vertically between a bottom and a top of the container;
    a lip positioned near the top of the container;
    a first nesting step located between the lip and the sidewall, the first nesting step extending circumferentially around the container, the first nesting step including a fixed slot area, the slot area forming a fixed recess in the first nesting step, whereby said recess extends in an inward direction of the container; and,
    a tag-accepting slot formed in the lip, the slot being positioned substantially above the slot area, whereby a tag can be inserted into the slot to extend into a portion of the slot area.

2. The plant container as recited in claim 1, wherein the nesting step includes a container-stacking stop surface and a surface extending in a vertical direction from the stop surface.

3. The plant container as recited in claim 1, wherein the nesting step includes a container-stacking stop surface and a reverse draft surface extending vertically and inwardly toward the container from the stop surface.

4. The plant container as recited in claim 1, wherein the nesting step is substantially absent in the slot area.

5. The plant container as recited in claim 1, wherein the nesting step is a rotational printing guide.

6. The plant container as recited in claim 1, further comprising a second nesting step located below the first nesting step.

7. The plant container as recited in claim 1, wherein the first nesting step is positioned adjacent to the lip.

8. The plant container as recited in claim 1, wherein the slot extends arcuately along the lip.

9. The plant container as recited in claim 1, wherein the slot area has a width, the width being substantially equal to or greater than a width of the slot.

10. The plant container as recited in claim 1, wherein the slot area has fixed dimensions.

11. The plant container as recited in claim 1, wherein the slot area has a fixed shape.

12. A plant container comprising:
   a frustoconical sidewall extending outwardly and vertically between a bottom and a top of the container;
   a lip positioned near the top of the container;
   a first nesting step located between the lip and the sidewall, the first nesting step extending circumferentially around the container, the nesting step including a container-stacking stop surface and a surface extending in a vertical direction from the stop surface; and,
   a tag-accepting slot formed in the lip, the slot substantially positioned above a fixed slot area such that a tag can be inserted into the slot to extend into a portion of the slot area, the slot area forming a fixed discontinuity along the nesting step.

13. The plant container as recited in claim 12, wherein the surface extending vertically extends at an inward direction toward the container at a reverse draft.

14. The plant container as recited in claim 12, wherein the first nesting step is positioned adjacent to the lip.

15. The plant container as recited in claim 12, wherein the nesting step is substantially absent in the slot area.

16. The plant container as recited in claim 12, wherein the slot extends arcuately along the lip.

17. The plant container as recited in claim 12, wherein the nesting step is a rotational printing guide.

18. A method of providing a plant container comprising the steps of:
   forming a plant container, the container comprising:
      a frustoconical sidewall extending outwardly and vertically between a bottom and a top of the container;
      a lip positioned near the top of the container; and,
      a first nesting step located between the lip and the sidewall, the first nesting step extending circumferentially around the container, the nesting step including a container-stacking stop surface and a surface extending in a direction vertically from the stop surface; and,
   punching a tag-accepting slot with a first die set through a portion of the lip, a portion of the first die set operating within a fixed slot area positioned along the first nesting step when punching the slot, the first die set comprising at least one punch and a corresponding die and the slot area forming a fixed recess in the first nesting step extending in an inward direction of the container.

19. The process as recited in claim 18, the step of forming includes:
   heating a sheet of thermoplastic material to a temperature higher than the material's glass transition temperature;
   placing the heated sheet over a thermal forming mold comprising a vacuum, the mold having a forming shape comprising:
      a frustoconical sidewall extending outwardly and vertically from a bottom of the container to a top of the container;
      a lip positioned near the top of the container; and,
      a first nesting step located below the lip and extending circumferentially around the container, the nesting step including a container-stacking stop surface and a surface extending vertically from the stop surface;
   using the vacuum to draw the sheet against the mold surface;
   cooling the sheet of material; and,
   ejecting the formed container from the mold.

20. The method recited in claim 18, further comprising the step of placing a plant identification tag into the tag slot, the tag also extending with in the slot area.

21. The method recited in claim 18, wherein the nesting step is substantially absent in the slot area.

22. The method recited in claim 18, wherein the first nesting step of the container is positioned adjacent to the lip.

* * * * *